(12) United States Patent
Chen et al.

(10) Patent No.: US 12,544,191 B2
(45) Date of Patent: Feb. 10, 2026

(54) MICRO-MAGNETIC INVISIBLE ORTHODONTIC APPLIANCE

(71) Applicant: Union Hospital, Tongji Medical College, Huazhong University of Science and Technology, Wuhan (CN)

(72) Inventors: LiLi Chen, Wuhan (CN); QingMing Tang, Wuhan (CN); JiWei Sun, Wuhan (CN); JunYuan Zhang, Wuhan (CN)

(73) Assignee: Union Hospital, Tongji Medical College, Huazhong University of Science and Technology, Wuhan (CN)

( * ) Notice: Subject to any disclaimer, the term of this patent is extended or adjusted under 35 U.S.C. 154(b) by 373 days.

(21) Appl. No.: 18/328,764

(22) Filed: Jun. 4, 2023

(65) Prior Publication Data

US 2024/0189071 A1   Jun. 13, 2024

Related U.S. Application Data

(63) Continuation of application No. PCT/CN2023/071434, filed on Apr. 24, 2023.

(30) Foreign Application Priority Data

Dec. 8, 2022 (CN) .......................... 202211569567.1

(51) Int. Cl.
*A61C 7/08* (2006.01)
(52) U.S. Cl.
CPC ..................................... *A61C 7/08* (2013.01)

(58) Field of Classification Search
CPC ..... A61C 7/08; A61C 7/006; A61F 2005/563; A61F 5/566; A61N 2/00
See application file for complete search history.

(56) References Cited

U.S. PATENT DOCUMENTS

| | | | |
|---|---|---|---|
| 6,702,575 B2* | 3/2004 | Hilliard .................... | A61C 7/08 433/18 |
| 2004/0139975 A1* | 7/2004 | Nelson ................... | A61N 2/004 623/23.72 |
| 2020/0261186 A1* | 8/2020 | Hunter ..................... | A61C 7/08 |
| 2023/0293266 A1* | 9/2023 | Jensen ................... | A61C 7/006 433/6 |

* cited by examiner

*Primary Examiner* — Eric J Rosen
*Assistant Examiner* — Luis Ruiz Martin
(74) *Attorney, Agent, or Firm* — Zhigang Ma

(57) ABSTRACT

A micro-magnetic invisible orthodontic appliance is provided. The micro-magnetic invisible orthodontic appliance includes a bottom brace (1), an outer periodontal brace (2) and an inner periodontal brace (3). The bottom brace (1), the outer periodontal brace (2) and the inner periodontal brace (3) together form a U-shaped brace. A tooth receiving groove is defined between the outer periodontal brace (2) and the inner periodontal brace (3). The bottom brace (1), the outer periodontal brace (2) and the inner periodontal brace (3) are made from one of a polymer composite material, biological ceramic, and an interpenetrating polymer network material, dispersed with permanent magnetic neodymium-iron-boron powder, by one-piece molding or three-dimensional printing.

6 Claims, 7 Drawing Sheets

MICRO-MAGNETIC INVISIBLE ORTHODONTIC APPLIANCE

CROSS-REFERENCE TO RELATED APPLICATION

This application claims priority to Chinese patent application No. 202211569567.1 filed on Dec. 8, 2022 and entitled "Micro-Magnetic Invisible Orthodontic Appliance", the entire contents of which are incorporated herein by reference.

TECHNICAL FIELD

The disclosure relates to the field of dental orthodontic appliance technology, and particularly to a micro-magnetic invisible orthodontic appliance.

BACKGROUND

Maxillofacial deformity is one of the three major oral diseases, and its prevalence rate is as high as 29.3%. The maxillofacial deformity not only affects facial aesthetics, but may further cause the oral diseases, or even psychological disorders in severe cases, for which prevention and treatment are of significant social requirement. At present, the most important prevention and treatment directed to the maxillofacial deformity is orthodontic treatment and the commonly used treatment plan includes a fixed treatment and an invisible treatment. The invisible orthodontic treatment relies on the development and innovation of orthodontic materials, and the advantages of concealment, beauty, convenience and hygiene make the invisible orthodontic treatment gradually emerge in clinical treatment in recent years. However, the invisible orthodontic treatment is constrained by a principle of gradually fine-tuned tooth movement, so that it has a lower efficiency and a longer treatment cycle, compared with the traditional fixed treatment. The orthodontic treatment cycle is affected by the patients and treatment-related factors, such as the severity of the maxillofacial deformity of the oral cavity, patients' compliance and treatment plan design. Generally, a comprehensive treatment cycle for the patients ranges from 12 to 36 months. A long treatment process will increase the risk of complications such as enamel demineralization, dental caries, root resorption, bone cracking, and bone fenestration, seriously affect the quality of life of the patients, increase the cost of the treatment, and reduce the compliance of the patients. Therefore, how to accelerate tooth movement more safely and effectively and to shorten the orthodontic treatment cycle has become an urgent problem in the field of orthodontic treatment.

The commonly used methods to accelerate tooth movement are mainly divided into three categories: surgery (i.e. corticotomy, etc.), physiatrics (i.e. low-energy laser, low-intensity pulsed ultrasound, etc.) and pharmaceutical methods (i.e. injection of hormone regulators, etc.). Using non-intervention physical stimulation to conduct external field regulation on orthodontic periodontal bone has the advantages of non-invasive, painless, and high acceptance, which is the future development direction of accelerated orthodontic treatment. Intermittent external field stimulation of orthodontic periodontal bone can accelerate tooth movement, shorten treatment cycle of patients and reduce adverse reactions of orthodontic treatment without side effects.

At present, the main orthodontic accelerators in the market are Well Lite orthodontic accelerator made in Europe and AcceleDent orthodontic accelerator made in the United States. The Well Lite orthodontic accelerator mainly uses low-energy infrared lasers to accelerate tooth movement, while the AcceleDent orthodontic accelerator mainly uses slight vibration to accelerate tooth movement. Both devices are orthodontic acceleration devices independently designed from conventional orthodontic components and devices, which further apply external field stimulation to teeth and periodontal tissues by a patient wearing a separate accelerator device into the oral and maxillofacial system. Patent No. ZL202110840674.2 provides an adjustable near-infrared orthodontic accelerator for achieving accurate treatment, which shortens the orthodontic treatment course through a plurality of slidably movable laser emitting devices. However, such method has a series of problems that an additional device is required to be used, the preparation and construction cost is high, the use and operation are not convenient, the oral hygiene problem is easily caused, the wearing comfort level of patients is poor, the compliance of patients is not high, and the like, which seriously restrict the curative effect and popularization rate of the existing orthodontic accelerating device in orthodontic clinical treatment and cannot effectively benefit the vast malocclusion deformity groups.

Magnetic field effects widely exist in nature and human tissues. Physiological-level local magnetic field stimulation has been proved to regulate bone metabolism, promote fracture healing and bone repair process. Mechanism research shows that the magnetic field stimulation can up-regulate the expression levels of osteogenesis-related proteins such as human bone morphogenetic protein-2 (BMP2), BMP4, neurogenic locus notch homolog protein 2 (NOTCH2) and osteocalcin (OC), and activate several signal pathways such as mitogen-activated protein kinase (MAPK), Canonical Wnt/β-catenin pathway (WNT/β-catenin) to promote the bone metabolism. Compared with local physical vibration stimulation and ultrasonic near-infrared stimulation, local magnetic field stimulation avoids the discomfort caused by mechanical stimulation to patients, and avoids the potential burning injury of near-infrared photothermal effect to oral mucosa, so that it is bio-friendly, comfortable, and its patient compliance is high. Therefore, the local magnetic field stimulation plays an important role in promoting the orthodontic alveolar bone metabolism and accelerating the tooth movement. The invisible orthodontic appliance is an essential core component in the invisible orthodontic treatment, and it is directly buckled on the teeth to exert orthodontic force, which controls the three-dimensional tooth movement to achieve the orthodontic treatment. The invisible orthodontic appliance runs through the whole orthodontic treatment cycle, so that when external field orthodontic acceleration is integrated into the invisible orthodontic appliance, the orthodontic treatment is achieved without using complex external equipment, and an integrated treatment plan of invisible correction and invisible acceleration can be achieved simultaneously. In the conventional invisible orthodontic treatment, the patients need to wear the invisible orthodontic appliance for more than 22 hours every day to achieve the tooth movement effectively, which poses a huge challenge to the patients' compliance and causes great discomfort and influence to the patients. Therefore, if the orthodontic acceleration can be integrated into the invisible orthodontic appliance, the treatment cycle can be effectively reduced while the treatment efficiency is improved, and the invisible orthodontic treatment will be expected to be greatly improved and optimized.

SUMMARY

The disclosure provides a micro-magnetic invisible orthodontic appliance, and the problems of long orthodontic cycle, long wearing time, poor comfort, inconvenient use, easily causing discomfort to patients and poor patient compliance can be solved by using one or more embodiments of the disclosure.

According to an embodiment of the disclosure, the micro-magnetic invisible orthodontic appliance includes: a bottom brace, an outer periodontal brace, and an inner periodontal brace. The bottom brace, the outer periodontal brace and the inner periodontal brace together form a U-shaped brace. A tooth receiving groove is defined between the outer periodontal brace and the inner periodontal brace. The bottom brace, the outer periodontal brace, and the inner periodontal brace are made from a polymer composite material, biological ceramic or an interpenetrating polymer network material, dispersed with permanent magnetic neodymium-iron-boron (NdFeB) powder, by one-piece molding or three-dimensional printing.

BRIEF DESCRIPTION OF DRAWINGS

In order to more clearly illustrate technical solutions in embodiments of the disclosure, the attached drawings used in the embodiments are briefly described below. Apparently, the attached drawings in the following description are some embodiments of the disclosure, and other drawings may be obtained from them without creative effort to those skilled in the art.

DESCRIPTION OF REFERENCE NUMERALS

1: bottom brace; 2: outer periodontal brace; 3: inner periodontal brace; 4: tooth receiving groove; 5: recess; 6: magnetizer block; 7: insertion rod; 8: arc snap-head; 9: insertion slot; 10: elastic snap-ring; 11: super-paramagnetic ferroferric oxide nanoparticles; 12: patch receiving slot; 13: flexible patch; 14: magnetic field exciter sheet; 15: adhesive layer; 16: outer covering layer; 17: inner core layer; 18: tooth.

DETAILED DESCRIPTION OF EMBODIMENTS

Technical solutions in embodiments of the disclosure will be clearly and completely described below in conjunction with the attached drawings used in the embodiments of the disclosure, the described embodiments are only some embodiments of the disclosure, and not all embodiments of the disclosure. Based on the described embodiments in the disclosure, all other embodiments obtained by those skilled in the art without creative effort should belong to the scope of protection of the disclosure.

It needs to be noted that all directional indications in the described embodiments of the disclosure are used only to explain relative positional relationship among components and motion of the components in a particular attitude, and if the particular attitude is changed, the directional indications change accordingly.

Furthermore, descriptions such as those involving "first" and "second" in the disclosure are for descriptive purposes only and are not to be construed as indicating or implying their relative importance or implicitly specifying the number of technical features indicated. Thus, the features defined with "first" and "second" may explicitly or implicitly include at least one such feature. In addition, the technical solutions of various described embodiments may be combined with each other, but only on the basis that those skilled in the art can realize. When a combination of technical solutions appears to be contradictory or unrealizable, such combination is regarded not to exist, and is not within the scope of protection of the disclosure.

The disclosure will be described in detail by referring to illustrated embodiments in combination with the attached drawings.

In one aspect of the disclosure, a micro-magnetic invisible orthodontic appliance is provided, and the problems of long orthodontic cycle, long wearing time, poor comfort, inconvenient use, patient discomfort and affecting patient compliance can be solved by using one or more embodiments of the disclosure.

Embodiment 1

Figure 1:
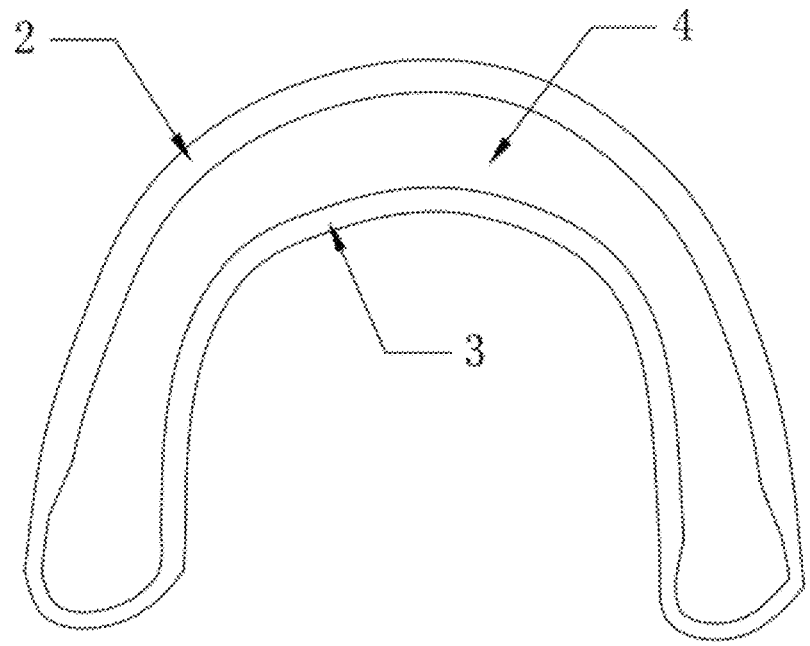
FIG. 1 illustrates a schematic top view of a micro-magnetic invisible orthodontic appliance according to an embodiment 1 of the disclosure.
Figure 2:
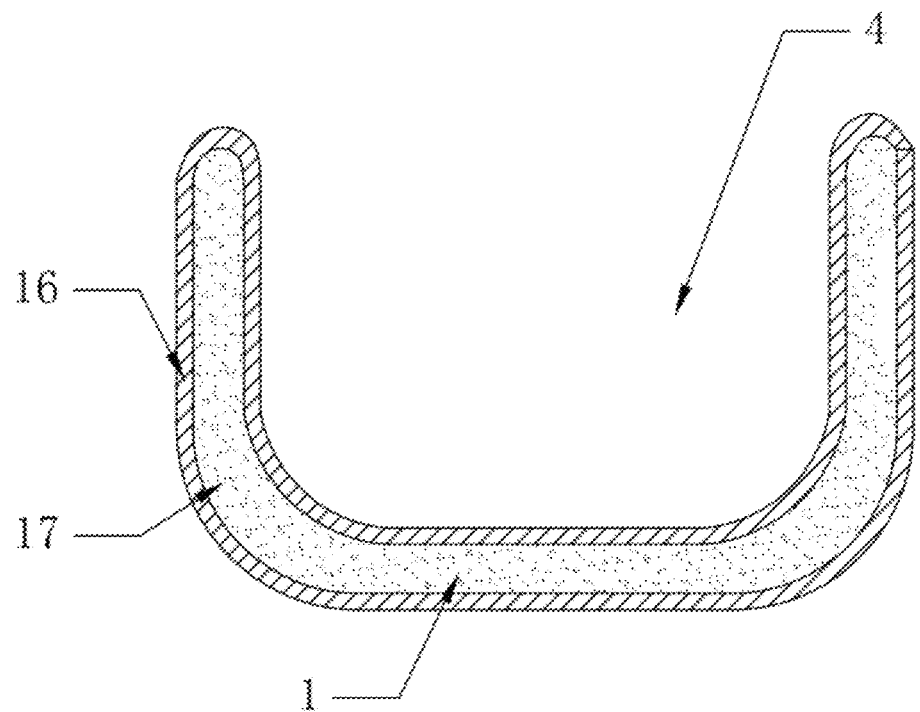
FIG. 2 illustrates a schematic longitudinal sectional view of the micro-magnetic invisible orthodontic appliance according to the embodiment 1 of the disclosure.

Referring to FIGS. 1-2, a micro-magnetic invisible orthodontic appliance according to the embodiment 1 of the disclosure includes: a bottom brace 1, an outer periodontal brace 2, and an inner periodontal brace 3. The bottom brace 1, the periodontal brace 2, and the inner periodontal brace 3 together form a U-shaped brace. There is a tooth receiving groove 4 defined between the outer periodontal brace 2 and the inner periodontal brace 3. The bottom brace 1, the outer periodontal brace 2, and the inner periodontal brace 3 are made from a polymer composite material, biological ceramic or an interpenetrating polymer network material, which are transparent and plastic, dispersed with permanent magnetic neodymium-iron-boron (NdFEB) powder, by one-piece molding or three-dimensional printing.

The U-shaped brace included the bottom brace 1, the outer periodontal brace 2 and the inner periodontal brace 3 is sleeved on teeth of a patient in the orthodontic treatment, and the teeth of the patient are placed in the tooth receiving groove 4. The bottom brace 1, the outer periodontal brace 2, and the inner periodontal brace 3 are made from the transparent and plastic polymer composite, the transparent and plastic biological ceramic or the transparent and plastic interpenetrating polymer network. The materials described above have good plasticity and good biocompatibility. The permanent magnetic NdFEB powder is dispersed into any one of the raw materials described above to prepare the micro-magnetic invisible orthodontic appliance by the one-piece molding or the three-dimensional printing. When the micro-magnetic invisible orthodontic appliance is used for the orthodontic treatment, it not only exerts an orthodontic force to the teeth for the tooth movement as is achieved by a conventional invisible orthodontic appliance, it also has well magnetic consistency, and is not easy to demagnetize because the dispersion of the permanent magnetic NdFEB powder. Therefore, the micro-magnetic invisible orthodontic appliance can maintain micro-magnetism for a long time and stimulate the teeth with local micro-magnetic field, thereby effectively promoting alveolar bone metabolism and tooth movement, and improving the efficiency of the orthodontic treatment.

In some embodiments, a thickness of each of the bottom brace 1, the outer periodontal brace 2 and the inner periodontal brace 3 is greater than or equal to 0.6 millimeters (mm) and is less than or equal to 2 mm.

In some embodiments, each of the bottom brace 1, the outer periodontal brace 2 and the inner periodontal brace 3 includes an outer covering layer 16 and an inner core layer 17. The outer covering layer 16 is made from polyethylene terephthalate and the inner core layer 17 is made from polyurethane or thermoplastic copolyester, dispersed with permanent magnetic NdFEB powder. The outer covering layer 16 has good flexibility and biocompatibility and maintains good comfort in contact with the teeth of the patient. The inner core layer 17 has good plasticity and micro-magnetism, which is convenient to manufacture while ensuring magnetism of the orthodontic appliance. Therefore, the materials and such a structure of the micro-magnetic invisible orthodontic appliance of the disclosure have good transparency and plasticity, which is convenient for personalized adaptation to the different patients, and is also beautiful and comfortable.

Embodiment 2

Figure 3:
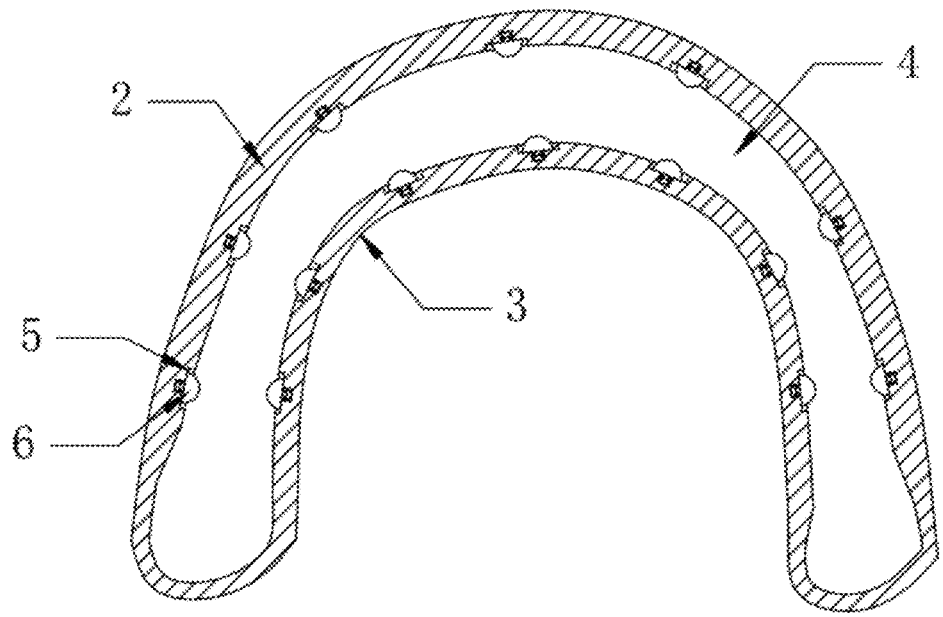
FIG. 3 illustrates a schematic top sectional view of a micro-magnetic invisible orthodontic appliance according to an embodiment 2 of the disclosure.
Figure 4:
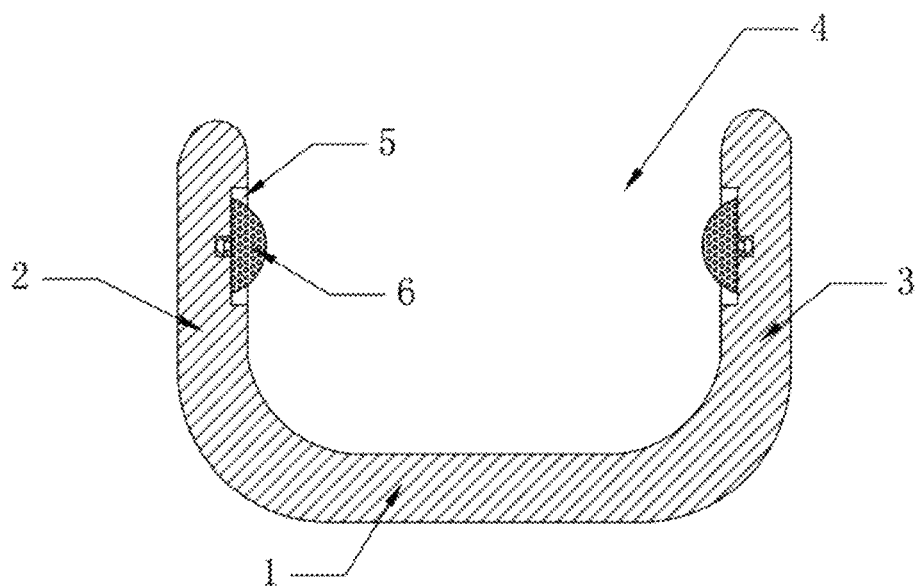
FIG. 4 illustrates a schematic longitudinal sectional view of the micro-magnetic invisible orthodontic appliance according to the embodiment 2 of the disclosure.
Figure 5:
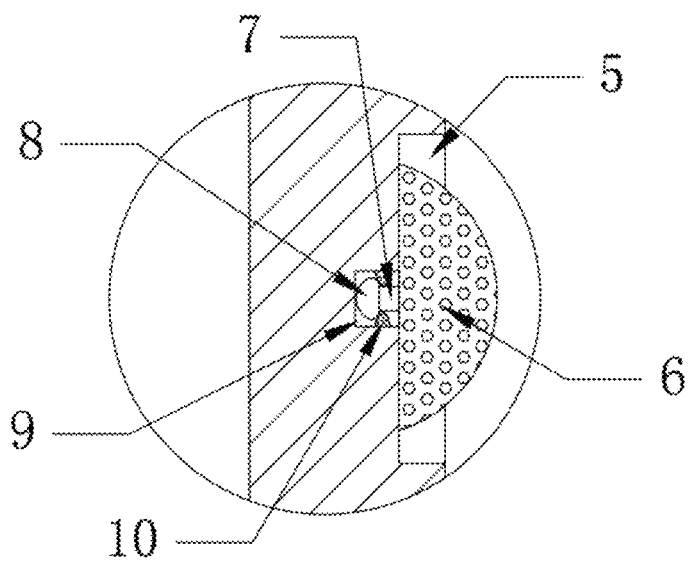
FIG. 5 illustrates a partially enlarged cross-sectional view of a magnetizer block of the micro-magnetic invisible orthodontic appliance according to the embodiment 2 of the disclosure.
Figure 6:
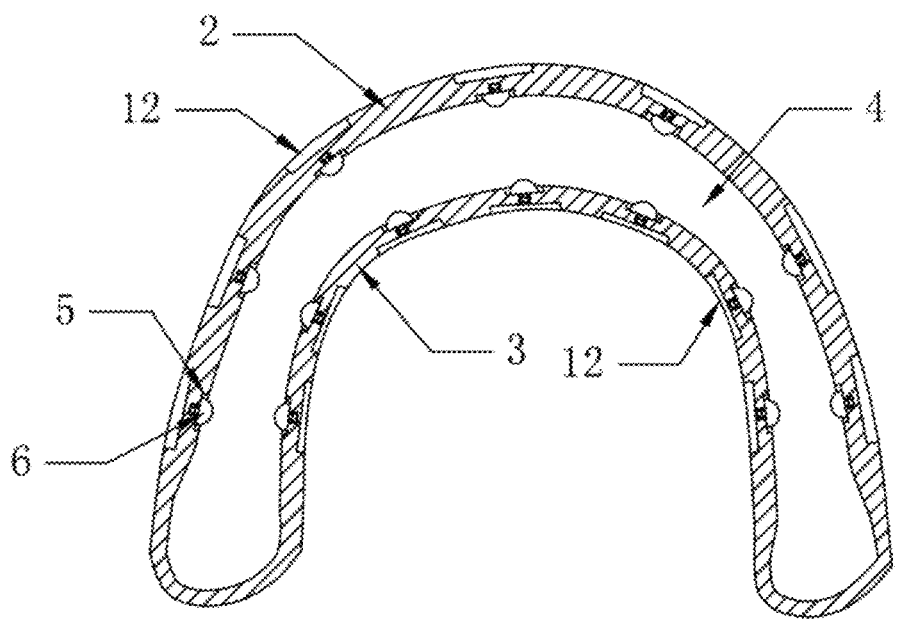
FIG. 6 illustrates a schematic top sectional view of a micro-magnetic invisible orthodontic appliance according to an embodiment 3 of the disclosure.
Figure 7:
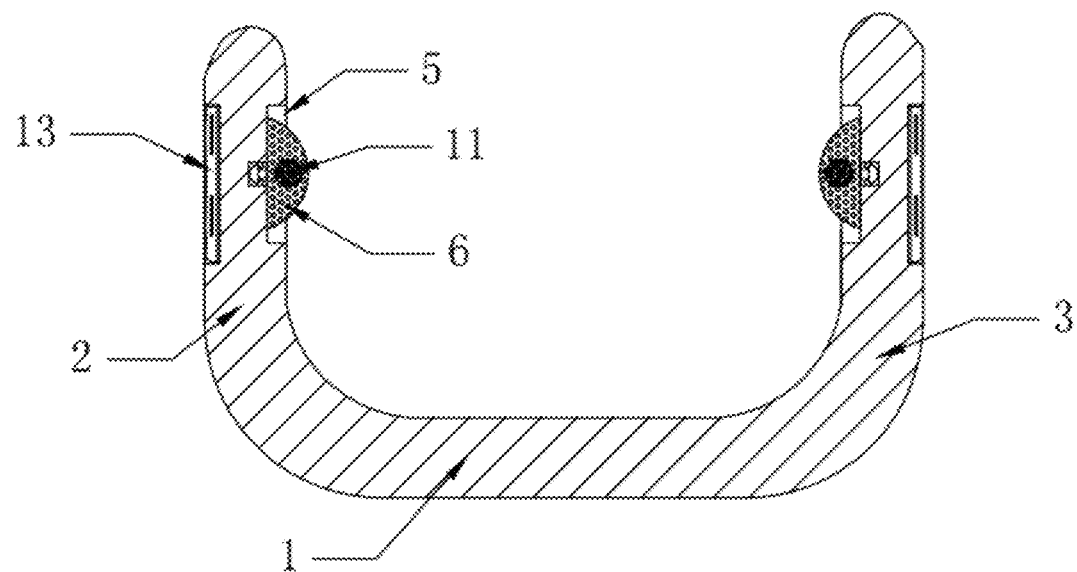
FIG. 7 illustrates a schematic longitudinal sectional view of the micro-magnetic invisible orthodontic appliance according to the embodiment 3 of the disclosure.
Figure 8:
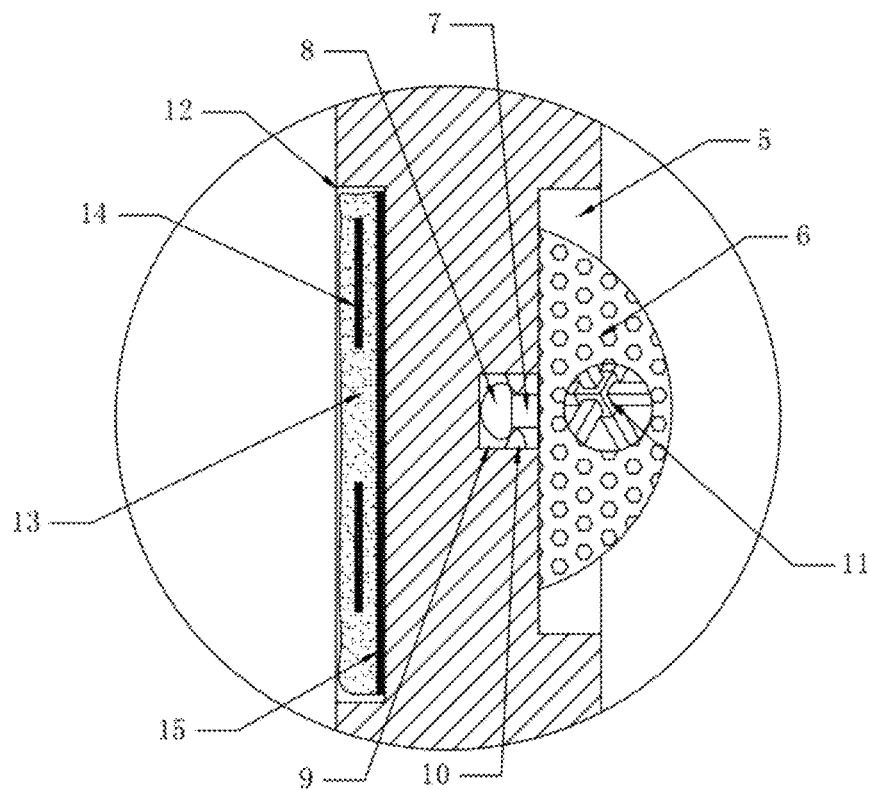
FIG. 8 illustrates a longitudinal partial enlarged cross-sectional view of a magnetizer block of the micro-magnetic invisible orthodontic appliance according to the embodiment 3 of the disclosure.
Figure 9:
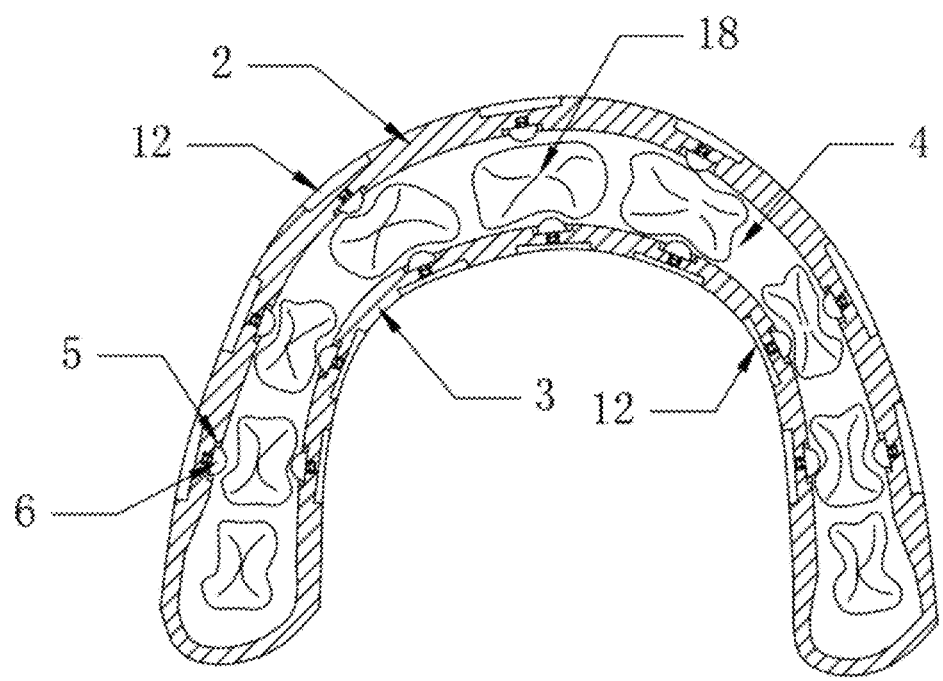
FIG. 9 illustrates a schematic longitudinal sectional view of the micro-magnetic invisible orthodontic appliance shown in the embodiment 3 of the disclosure in use.
Figure 10:
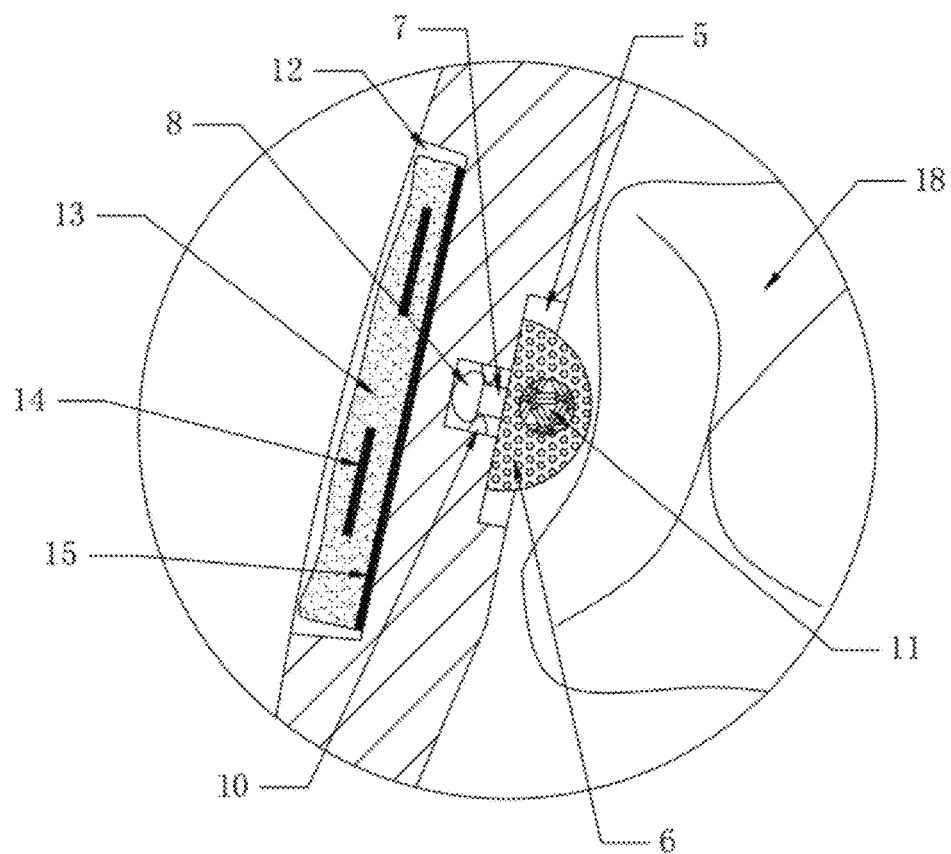
FIG. 10 illustrates a partially enlarged cross-sectional view of the magnetizer block of the micro-magnetic invisible orthodontic appliance shown in the embodiment 3 of the disclosure in use.

Referring to FIGS. 3-5, a micro-magnetic invisible orthodontic appliance according to the embodiment 2 of the disclosure includes: a bottom brace 1, an outer periodontal brace 2, and an inner periodontal brace 3. The bottom brace 1, the outer periodontal brace 2, and the inner periodontal brace 3 together form a U-shaped brace. There is a tooth receiving groove 4 defined between the outer periodontal brace 2 and the inner periodontal brace 3. The bottom brace 1, the outer periodontal brace 2, and the inner periodontal brace 3 are made from a transparent plastic polymer composite material, transparent plastic biological ceramic or a transparent plastic interpenetrating polymer network material, dispersed with permanent magnetic NdFEB powder, by one-piece molding or three-dimensional printing.

In some embodiments, a side of each of the outer periodontal brace 2 and the inner periodontal brace 3 facing towards the tooth receiving groove 4 is disposed with a plurality of recesses 5, and each of the plurality of recesses 5 is provided with a magnetizer block 6 therein. The recesses 5 are positioned at upper parts of the outer periodontal brace 2 and the inner periodontal brace 3, and are close to roots of the teeth of the patient while the micro-magnetic invisible orthodontic appliance is used. The magnetic strength of the magnetizer block 6 is greater than that of the outer periodontal brace 2 or the inner periodontal brace 3. The magnetizer block 6 is used for increasing the magnetic strength of the position corresponding to the root of the tooth of the patient, thereby generating a relatively high-intensity magnetic stimulation directed to the root of the tooth to improve the tooth movement during the orthodontic treatment.

In some embodiments, the magnetizer block 6 is made from a non-magnetic matrix dispersed with permanent magnetic NdFEB powder. According to different density of the permanent magnetic material added in the matrix, the magnetizer block 6 can have different magnetic strength.

In some embodiments, the magnetizer block 6 is detachably connected into the corresponding recess 5, which is convenient to install or remove the magnetizer block 6 according to different requirements during the orthodontic treatment. The magnetizer block 6 has different specifications, which is achieved by adding different density of the permanent magnetic material to make the magnetizer block 6 possess different magnetic strength. Therefore, the patient can replace the magnetizer block 6 with different specification to adjust the intensity of magnetic stimulation.

In some embodiments, the magnetizer block 6 is provided with an insertion rod 7 thereon, a top end of the insertion rod 7 is provided with an arc snap-head 8, the recess 5 is provided with an insertion slot 9 therein, and the insertion slot 9 is provided with an elastic snap-ring 10 therein. The arc snap-head 8 is used to cooperate with the elastic snap-ring 10 disposed in the insertion slot 9 to fix the magnetizer block 6 and facilitate the installation and removal of the magnetizer block 6.

Embodiment 3

Referring to FIGS. 6-10, a micro-magnetic invisible orthodontic appliance according to the embodiment 2 of the disclosure includes: a bottom brace 1, an outer periodontal brace 2, and an inner periodontal brace 3. The bottom brace 1, the outer periodontal brace 2, and the inner periodontal brace 3 together form a U-shaped brace. There is a tooth receiving groove 4 defined between the outer periodontal brace 2 and the inner periodontal brace 3. The bottom brace 1, the outer periodontal brace 2, and the inner periodontal brace 3 are made from a transparent plastic polymer composite material, transparent plastic biological ceramic or a transparent plastic interpenetrating polymer network material, dispersed with permanent magnetic NdFeB powder, by one-piece molding or three-dimensional printing.

In some embodiments, a side of each of the outer periodontal brace 2 and the inner periodontal brace 3 facing towards the tooth receiving groove 4 is disposed with a plurality of recesses 5, and each of the plurality of recesses 5 is provided with a magnetizer block 6 therein. The recesses 5 are positioned at upper parts of the outer periodontal brace 2 and the inner periodontal brace 3, and are close to roots of the teeth of the patient while the micro-magnetic invisible orthodontic appliance is used. The magnetic strength of the magnetizer block 6 is greater than that of the outer periodontal brace 2 or the inner periodontal brace 3. The magnetizer block 6 is used for increasing the magnetic strength of the position corresponding to the root of the tooth of the patient, thereby generating a relatively high-intensity magnetic stimulation directed to the root of the tooth to improve the tooth movement during the orthodontic treatment.

In some embodiments, the magnetizer block 6 is provided with an insertion rod 7 thereon, a top end of the insertion rod 7 is provided with an arc snap-head 8, the recess 5 is provided with an insertion slot 9 therein, and the insertion slot 9 is provided with an elastic snap-ring 10 therein. The arc snap-head 8 is used to cooperate with the elastic snap-ring 10 disposed in the insertion slot 9 to fix the magnetizer block 6 and facilitate the installation and removal of the magnetizer block 6.

In some embodiments, the magnetizer block 6 is made from non-magnetic material, the magnetizer block 6 is provided with super-paramagnetic ferroferric oxide nanoparticles 11 therein. The magnetizer block 6 has different specifications with different magnetic strength according to different mass of the super-paramagnetic ferroferric oxide nanoparticles 11 added in it. Therefore, the patient can replace the magnetizer block 6 with different specification to adjust the intensity of magnetic stimulation.

In some embodiments, a side of each of the outer periodontal brace 2 and the inner periodontal brace 3 facing away from the tooth receiving groove 4 is disposed with a plurality of patch receiving slots 12 respectively corresponding to the plurality of recesses 5. Each of the plurality of patch receiving slots 12 is provided with a flexible patch 13 therein, the flexible patch 13 is provided with a magnetic field exciter sheet 14, and the magnetic field exciter sheet 14 is made of permanent magnetic NdFEB. The super-paramagnetic ferroferric oxide nanoparticles 11 disposed in the magnetizer block 6 are unstable in magnetism under a general state and have low magnetic strength. The magnetic field strength of the super-paramagnetic ferroferric oxide nanoparticles 11 is easily affected by a surrounding magnetic field. The magnetic field exciter sheet 14 disposed in the flexible patch 13 is magnetic and is used to magnetically excite the super-paramagnetic ferroferric oxide nanoparticles 11. The flexible patch 13 is put into the corresponding patch receiving slot 12 to control the magnetic field strength released by the super-paramagnetic ferroferric oxide nanoparticles 11 disposed in the magnetic block 6 at the corresponding position, so that the magnetic strength of the magnetic block 6 at different position corresponding to different tooth can be adjusted, thereby controlling tooth movement speed of the different tooth during the orthodontic treatment.

In some embodiments, the flexible patch 13 is made of silicone dispersed with permanent magnetic NdFEB powder, and the flexible patch 13 is provided with an adhesive layer 15 thereon, so that the shape of the flexible patch 13 can not only be changed at will, and the flexible patch 13 is also convenient to paste on and take off from the patch receiving slot 12.

Embodiment 4

Figure 11:
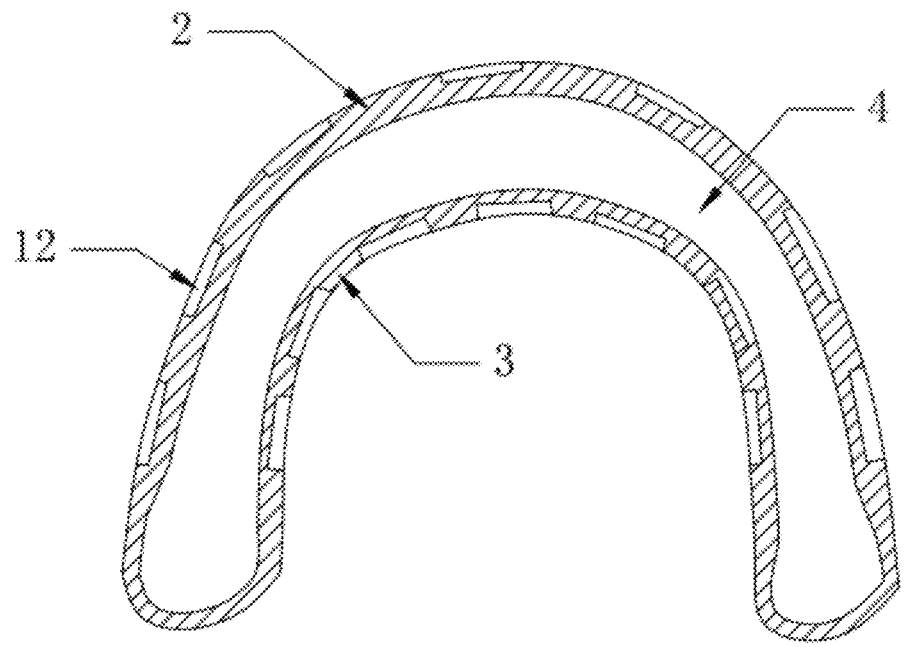
FIG. 11 illustrates a schematic top view of a micro-magnetic invisible orthodontic appliance according to an embodiment 4 of the disclosure.
Figure 12:
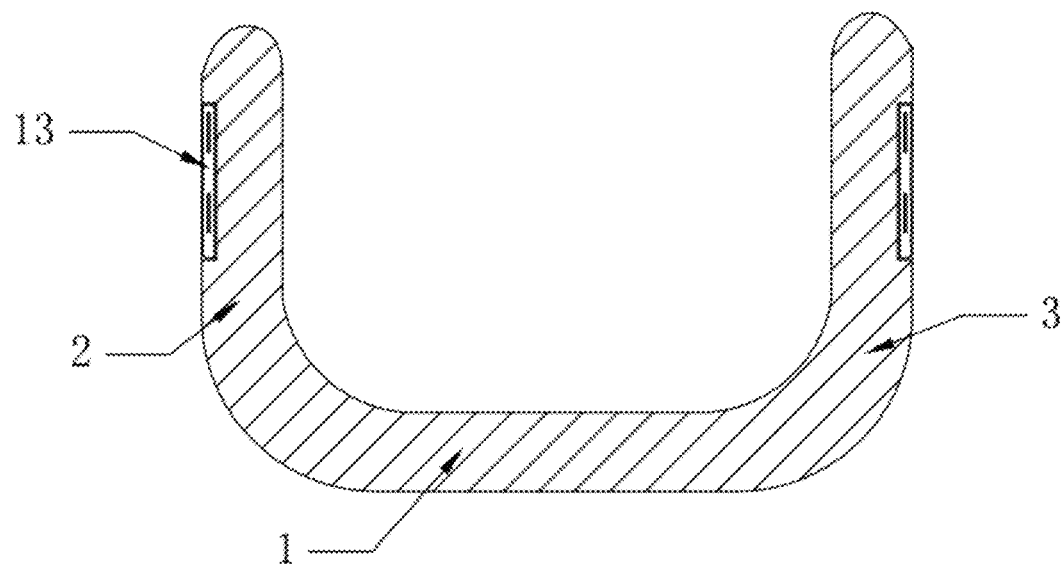
FIG. 12 illustrates a longitudinal sectional view of the micro-magnetic invisible orthodontic appliance according to the embodiment 4 of the disclosure.
Figure 13:
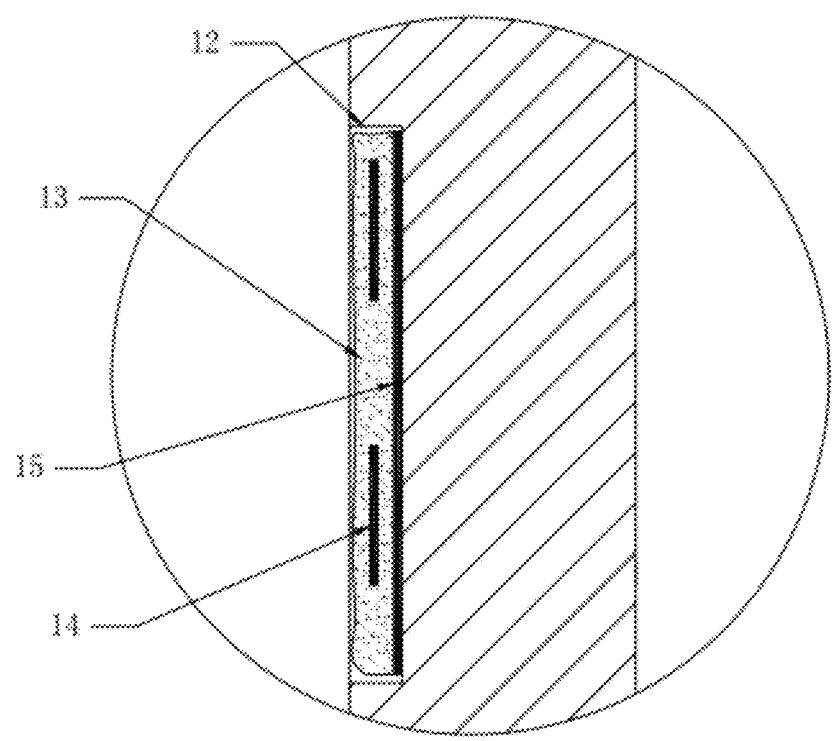
FIG. 13 illustrates a longitudinal partially enlarged cross-sectional view of a patch receiving slot of the micro-magnetic invisible orthodontic appliance according to the embodiment 4 of the disclosure.

Referring to FIGS. 11-13, a micro-magnetic invisible orthodontic appliance according to the embodiment 4 of the disclosure includes: a bottom brace 1, an outer periodontal brace 2, and an inner periodontal brace 3. The bottom brace 1, the periodontal brace 2, and the inner periodontal brace 3 together form a U-shaped brace. There is a tooth receiving groove 4 defined between the outer periodontal brace 2 and the inner periodontal brace 3. The bottom brace 1, the outer periodontal brace 2, and the inner periodontal brace 3 are made from a polymer composite material, biological ceramic or an interpenetrating polymer network material, dispersed with permanent NdFEB powder, by one-piece molding or three-dimensional printing. A plurality of patch receiving slots 12 are disposed on a side of each of the outer periodontal brace 2 and the inner periodontal brace 3 facing away from the tooth receiving groove 4, each of the plurality of patch receiving slots 12 is provided with a flexible patch 13 therein, the flexible patch 13 is provided with a magnetic field exciter sheet 14, and the magnetic field exciter sheet 14 is made of permanent magnetic NdFEB. The flexible patch 13 is made of silicone dispersed with permanent magnetic NdFEB powder, and the flexible patch 13 is provided with an adhesive layer 15 thereon, so that the shape of the flexible patch 13 can not only be changed at will, and the flexible patch 13 is also convenient to paste on and take off from the patch receiving slot 12. The super-paramagnetic ferroferric oxide Nano powder is unstable in magnetism under a general state and has low magnetic strength, and the magnetic field strength of the super-paramagnetic ferroferric oxide Nano powder is easily affected by a surrounding magnetic field. The magnetic field exciter sheet 14 disposed in the flexible patch 13 is magnetic and is used to magnetically excite the super-paramagnetic ferroferric oxide Nano powder inside the bottom brace 1, the outer periodontal brace 2 and the inner periodontal brace 3. The flexible patch 13 is put into the corresponding patch receiving slot 12 to control the magnetic field strength released by the super-paramagnetic ferroferric oxide Nano powder at the corresponding position, so that the magnetic strength at the position of the different tooth can be adjusted, thereby controlling and the tooth movement speed of different tooth during the orthodontic treatment.

A using method of the micro-magnetic invisible orthodontic appliance of the disclosure is as follows. The patient puts the orthodontic appliance into him/her oral cavity, the teeth of the patient are put into the tooth receiving groove 4. The bottom brace 1, the outer periodontal brace 2 and the inner periodontal brace 3 wrap the teeth needed to perform the orthodontic treatment. The width of the bottom brace 1 is slightly smaller than that of gums of the patient, so that the micro-magnetic invisible orthodontic appliance can be directly clamped on the teeth under the action of its elastic force without continuous biting after the patient puts on the micro-magnetic invisible orthodontic appliance, and the micro-magnetic invisible orthodontic appliance can be applied to the patient with various deformed tooth shapes. The teeth are surrounded by the bottom brace 1, the outer periodontal brace 2 and the inner periodontal brace 3. The outer periodontal brace 2 is located on an outer surface of the teeth of the patient, and the magnetizer blocks 6 are attached to the teeth of the patient, where are close to the roots of the teeth of the patient. And then, the flexible patches 13 are selectively applied in the corresponding patch receiving slots 12 disposed on the corresponding positions of the deformed teeth according to different orthodontic force required by the different deformed teeth. The magnetic field exciter sheets 14 disposed in the flexible patches 13 excite the super-paramagnetic ferroferric oxide nanoparticles 11 in the magnetizer blocks 6 at the corresponding positions to enhance the magnetic field strength, so that the magnetic strength of the different magnetizer blocks 6 corresponding to the different tooth can be adjusted, thereby controlling the tooth movement speed of the different tooth. As the orthodontic treatment includes multiple links and processes for an overall reconstruction of the teeth and jaws, the teeth to be moved are constantly adjusted in different stages according to the orthodontic treatment plan. Therefore, the four technical solutions in the embodiments 1-4 can be selectively used in different stages of the orthodontic treatment to accurately regulate and control the intensity of the micro-magnetic stimulation, thereby realizing accurate and adjustable personalized partial micro-magnetic field acceleration treatment for the teeth. For one tooth to be performed the orthodontic treatment, the osteoclast behavior of alveolar bone is superior to the osteogenic behavior in the early orthodontic treatment, which aims to provide the potential power for the tooth movement. However, the osteogenic behavior of alveolar bone prevails in the late orthodontic treatment to stabilize the positions of the teeth. Therefore, the intensity of micro-magnetic field stimulation applied locally should be adjusted according to the corresponding physiological principle. The patient can adopt the technical solutions in the embodiments 2-4 to regulate and control the intensity of the stimulated micro-magnetic field, so that different requirements for the micro-magnetic field are satisfied according to the teeth to be moved in different stages.

Compared with the art, the disclosure has beneficial effects as follows. (1) Permanent magnetic NdFEB powder is dispersed in the matrix of the bottom brace, the outer periodontal brace and the inner periodontal brace by the one-piece molding or the three-dimensional printing to prepare the micro-magnetic invisible orthodontic appliance, so that an external device required in the conventional orthodontic treatment is eliminated, the mechanical orthodontic force and low-strength micro-magnetic field stimulation can be applied to local periodontal soft and hard tissues to facilitate promoting tissue reconstruction efficiency, effectively reducing the wearing time and improving comfort. (2) The magnetizer blocks with different magnetic strength are selectively installed, so that the presence and the strength of local micro-magnetic stimulation to the teeth can be controlled, and the compliance of the patient is improved. (3) The super-paramagnetic ferroferric oxide nanoparticles are dispersed in the magnetizer blocks, the patch receiving slots capable of mounting the flexible patches are disposed on the outer periodontal brace and the inner periodontal brace facing away from the tooth receiving groove, and the magnetic field exciter sheets with magnetism are disposed in the flexible patches, which can together control the magnetic field strength released by the super-paramagnetic ferroferric oxide nanoparticles in the magnetizer blocks, so that the magnetic stimulation strength is adjusted according to the different tooth to be treated, thereby controlling the tooth movement speed. And the micro-magnetic invisible orthodontic appliance is simple and convenient to use, and the patient compliance is high.

In the description of the disclosure, it needs to be understood that the terms "center", "longitudinal", "transverse", "length", "width", "thickness", "up", "down", "front", "back", "left", "right", "vertical", "horizontal", "top", "bottom", "inside", "outside, "clockwise", "counterclockwise", and the like indicate orientation or positional relationships, which are based on the attached drawings. In addition, the terms are intended only to facilitate the description of the disclosure and simplify the description, and are not intended to indicate or imply that the devices or components referred to must have a particular orientation, be constructed and operated in a particular orientation. Therefore, the terms cannot be understood as limiting the disclosure.

In the description of the disclosure, unless otherwise expressly specified and limited, the first feature "on" or "under" the second feature may include a direct contact between the first feature and the second feature, or may include that the first feature and the second feature are not in contact directly, but through another features between them. Also, the first feature being "on", "upper" and "above" the second feature includes the first feature being directly above and diagonally above the second feature, or simply indicating that the first feature is horizontally higher above the second feature. The first feature being "under", "lower" and "below" the second feature includes the first feature being directly below and diagonally below the second feature, or simply indicating that the first feature is less than the horizontal height of the second feature.

In the description of the specification, reference to the terms "an embodiment", "some embodiments", "example", "the illustrated embodiment", or "some examples", the above descriptions mean that the specific features, structures, materials, or characteristics described in connection with the embodiment or example are included in at least one embodiment or example of the disclosure. In the specification, the schematic representation of the above terms need not be directed to the same embodiment or example. Moreover, the specific features, structures, materials, or characteristics described may be combined in a suitable manner in any one or more embodiments or examples. In addition, those skilled in the art may join and combine the different embodiments or examples described in the specification.

Although the illustrated embodiments of the disclosure have been described, those skilled in the art can make additional changes and modifications to these embodiments based on basic concepts. Therefore, the appended claims are intended to be construed to include the illustrated embodiments and all changes and modifications that fall within the scope of the disclosure.

Apparently, those skilled in the art can make various modifications and variations to the disclosure without departing from the spirit and scope of the disclosure. Therefore, if the various modifications and variations of the disclosure fall within the scope of protection of the appended claims and their technical equivalents, the disclosure is also intended to encompass such modifications and variations.

What is claimed is:

1. A micro-magnetic invisible orthodontic appliance, comprising: a bottom brace, an outer periodontal brace and an inner periodontal brace;
   wherein the bottom brace, the outer periodontal brace and the inner periodontal brace together form a U-shaped brace;
   wherein a tooth receiving groove is defined between the outer periodontal brace and the inner periodontal brace;
   wherein the bottom brace, the outer periodontal brace and the inner periodontal brace are made from one of a polymer composite material, biological ceramic and an interpenetrating polymer network material, dispersed with permanent magnetic neodymium-iron-boron (NdFeB) powder, by one-piece molding or three-dimensional printing;

wherein a side of each of the outer periodontal brace and the inner periodontal brace facing towards the tooth receiving groove is disposed with a plurality of recesses and each of the plurality of recesses is provided with a magnetizer block therein; and wherein the magnetizer block is made from non-magnetic material, the magnetizer block is provided with superparamagnetic ferroferric oxide nanoparticles therein, a side of each of the outer periodontal brace and the inner periodontal brace facing away from the tooth receiving groove is disposed with a plurality of patch receiving slots respectively corresponding to the plurality of recesses; each of the plurality of patch receiving slots is provided with a flexible patch therein, the flexible patch is provided with a magnetic field exciter sheet, and the magnetic field exciter sheet is made of permanent magnetic NdFeB.

2. The micro-magnetic invisible orthodontic appliance according to claim 1, wherein the magnetizer block is detachably connected into a corresponding one of the plurality of recesses.

3. The micro-magnetic invisible orthodontic appliance according to claim 2, wherein the magnetizer block is provided with an insertion rod thereon, and a top end of the insertion rod is provided with an arc snap-head; and the recess is provided with an insertion slot therein, and the insertion slot is provided with an elastic snap-ring therein.

4. The micro-magnetic invisible orthodontic appliance according to claim 1, wherein the flexible patch is made of silicone dispersed with permanent magnetic NdFeB powder, and the flexible patch is provided with an adhesive layer thereon.

5. The micro-magnetic invisible orthodontic appliance according to claim 1, wherein each of the bottom brace, the outer periodontal brace and the inner periodontal brace comprises an outer covering layer and an inner core layer, the outer covering layer is made from polyethylene terephthalate; and the inner core layer is made from one of polyurethane and thermoplastic copolyester, dispersed with permanent magnetic NdFeB powder.

6. The micro-magnetic invisible orthodontic appliance according to claim 1, wherein a thickness of each of the bottom brace, the outer periodontal brace and the inner periodontal brace is in a range of 0.6 millimeters (mm) to 2 mm.

* * * * *